United States Patent [19]
Godo

[11] Patent Number: 6,046,557
[45] Date of Patent: Apr. 4, 2000

[54] FOCUSING CONTROLLER FOR SURVEY INSTRUMENT

[75] Inventor: Etsuji Godo, Tokyo-to, Japan

[73] Assignee: Kabushiki Kaisha Topcon, Tokyo-to, Japan

[21] Appl. No.: 09/176,850

[22] Filed: Oct. 22, 1998

[30] Foreign Application Priority Data

Nov. 11, 1997 [JP] Japan ..................................... 9-325311

[51] Int. Cl.[7] ...................................................... H02P 1/00
[52] U.S. Cl. .......................... 318/257; 318/257; 318/280; 318/282; 318/445; 318/443; 318/466; 318/468
[58] Field of Search ..................................... 318/257, 280, 318/282, 445, 443, 466, 468; 358/474, 227

[56] References Cited

U.S. PATENT DOCUMENTS 4,903,134  2/1990  Murashima et al. ..................... 358/474
5,767,989  6/1998  Sakaguchi ........................... 318/257 X

*Primary Examiner*—Karen Masih
*Attorney, Agent, or Firm*—Nields, Lemack & Dingman

[57] ABSTRACT

The present invention provides a focusing controller for a survey instrument, and the focusing controller comprises a sliding tube for retaining a focusing lens and movable in the direction of an optical axis, a motor for moving the sliding tube in the direction of the optical axis, a motor driving control circuit for driving the motor, a rotating speed control switch which serves as a means for inputting coarse adjustment control to the driving circuit, and a rotating position control switch which serves as a means for inputting fine adjustment control to the motor driving circuit, whereby the focusing lens is moved at a speed proportional to rotating angle of a rotating speed control switch by turning the rotating speed control switch for coarse control, and the focusing lens is moved to a position corresponding to rotating angle of a rotating position control switch by turning the rotating position control switch for fine control.

8 Claims, 4 Drawing Sheets

FOCUSING CONTROLLER FOR SURVEY INSTRUMENT

BACKGROUND OF THE INVENTION

The present invention relates to a focusing controller for a collimating telescope used on a survey instrument.

Description will be given first on a conventional type focusing mechanism for a survey instrument referring to FIG. 3 and FIG. 4.

Even in the electronically designed survey instrument as recently developed, a collimating telescope is used for collimating a target object. The collimating telescope is provided with a controller that is required when an operator collimates the target object.

A leveling instrument 1 is mounted on a tripod 2, and a staff 3 is erected at a target point. In the leveling survey operation, the leveling instrument 1 is placed at a horizontal position. Then, graduation on the staff 3 is observed and read through a collimating telescope 5 of the leveling instrument 1, and difference in height is surveyed according to a graduation pattern 4 on the staff 3.

When the difference in height is surveyed by collimating the staff 3, it is necessary to perform focusing operation on the staff 3, and focusing accuracy of the collimating telescope 5 also exerts influence on the accuracy of the survey.

Now, a conventional type focusing unit 7 will be described referring to FIG. 4.

On the operator side of a body tube 10, an ocular lens 11 is mounted, and an objective lens 12 is mounted on the other side of the body tube 10. Inside the body tube 10, a sliding tube 13 is slidably arranged. A focusing lens (not shown) is mounted in the sliding tube 13, and a rack 14 extending in the direction of generatrix is formed on outer surface of the sliding tube 13.

A pinion shaft 15 is rotatably provided in a direction perpendicular to the axis of the body tube 10, and gear teeth are engraved on the tip of the pinion shaft 15, and this serves as a pinion gear 16 engaged with the rack 14. On an exposed end of the pinion shaft 15, a focusing knob 17 is fitted.

In the focusing operation, when a surveyor collimates the staff 3 through the objective lens 11, the focusing knob 17 is turned. Then, the pinion shaft 15 is rotated, and the sliding tube 13 is moved along the optical axis via the rack 14, and optimal focusing condition is attained.

In the conventional type leveling instrument as described above, a graduation pattern 4 on the staff 3 is read. Whether the reading of values is accurate or not depends upon the skill of the surveyor. Variations between the surveyors are eliminated by taking average of the read values. With the introduction of numerical value processing, difference of the measurement accuracy between beginners and skillful operators is now not very conspicuous. However, since the focusing mechanism is still operated manually as described above, there are considerable differences in operational time and skill between beginners and experienced operators. In case the operator is not very familiar with focusing operation, the leveling instrument may be inadvertently vibrated or jerked, thus impairing leveling condition of the leveling instrument. Further, the impairment of the leveling condition may directly exert influence on the measurement accuracy.

SUMMARY OF THE INVENTION

It is an object of the present invention to provide a focusing controller, by which it is possible to perform focusing at the measuring point in quick and accurate manner and to reduce individual difference between operators in the measurement.

To attain the above object, the focusing controller according to the present invention includes a focusing lens which is moved at a speed proportional to the rotating angle of a rotating speed control switch. Fast and accurate focusing can be carried out.

DETAILED DESCRIPTION OF THE PREFERRED EMBODIMENT

Figure 1:
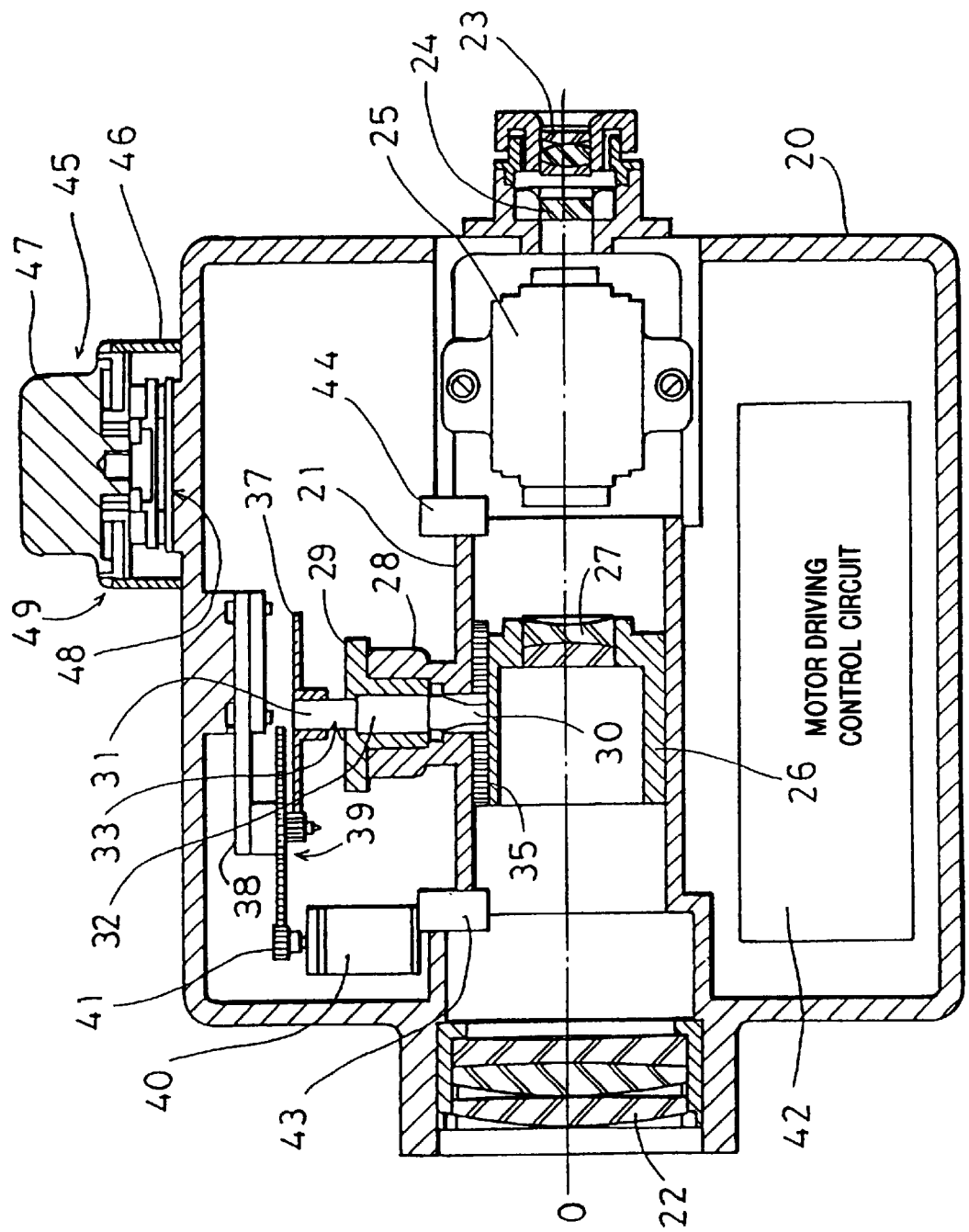
FIG. 1 is a horizontal sectional view of an embodiment of the present invention.

In the following, description will be given on an embodiment of the present invention referring to the attached drawings.

A body tube 21 is arranged to penetrate through the central portion of a housing 20 designed in box-like planar shape, and an objective lens 22 is mounted at the tip of the body tube 21. On the base end of the body tube 21, an ocular lens 23 is mounted, and a reticle 24 is arranged on the side of the ocular lens 23 closer to the objective lens 22. At a position inside the reticle 24 and facing toward the objective lens 22, a compensation optical system 25 is arranged.

Inside the body tube 21, a sliding tube 26 is slidably placed between the objective lens 22 and the compensation optical system 25. A focusing lens 27 is mounted on the sliding tube 26 in such manner that, with the sliding movement of the sliding tube 26, the focusing lens 27 is moved along optical axis of the objective lens 22, the ocular lens 23 and the compensation optical system 25. On a portion of the sliding tube 26, a rack 35 is formed in parallel to the optical axis.

On one side of the body tube 21, a gear holder 28 in cylindrical shape and positioned perpendicularly to the optical axis is protruded, and a bearing 29 is fitted on the gear holder 28. A gear shaft 33 is rotatably mounted on the gear holder 28 via the bearing 29.

The gear shaft 33 comprises a pinion gear 30 on one end, a gear support 31 on the other end, and a rotation support 32 at the center, and the rotation support 32 is rotatably fitted in the bearing 29. The pinion gear 30 is protruded inwardly in the body tube 21 and is engaged with the rack 35. The gear support 31 is protruded into a space defined by the body tube 21 and the housing 20, and a driven gear 37 is engaged on the gear support 31.

A gear support plate 38 positioned opposite to the driven gear 37 is fixed on the housing 20, and a reduction gear 39, wherein a pinion is integrated with a gear wheel, is rotatably supported on the gear support plate 38. A focusing motor 40 is arranged at a position opposite to the reduction gear 39, and a driving gear 41 is mounted on the output shaft of the focusing motor 40. The driving gear 41 is engaged with the gear wheel of the reduction gear 39, and the pinion of the reduction gear 39 is engaged with the driven gear 37.

The rotation of the focusing motor 40 is transmitted to the gear shaft 33 and the pinion gear 30 with its speed reduced via the driving gear 41, the reduction gear 39 and the driven gear 37. With the rotation of the pinion gear 30, the sliding tube 26 is moved along the optical axis via the rack 35. Based on the number of revolutions of a chosen gear in a driving system, which comprises the driven gear 37, the reduction gear 39, the driving gear 41, the focusing motor 40, etc., an encoder (not shown) is provided to issue positional information of the focusing lens 27 as a pulse signal with a predetermined number of bits, and the signal from the encoder is inputted to a motor driving control circuit 42 to be described later.

The driving of the focusing motor 40 is controlled by the motor driving control circuit 42. At each end of stroke of the sliding tube 26, limit switches 43 and 44 are arranged respectively. When the sliding tube 26 comes into contact with one of the limit switches 43 or 44, the signal from the limit switches 43 or 44 is inputted to the motor driving control circuit 42, and the focusing motor 40 is stopped. Instead of the limit switches, a torque limiter may be provided on the driving portion to physically cut or impede the driving force.

A focusing operation signal to be inputted to the motor driving control circuit 42 is given by a focusing position control switch 49, which comprises a focusing knob 45 and a control switch 48 issuing electric signals corresponding to rotation of the focusing knob 45.

The focusing knob 45 comprises a coarse adjustment knob 46 and a fine adjustment knob 47 that are respectively rotatable, and the control switch 48 comprises a coarse control switch 50 and a fine control switch 51. The coarse adjustment knob 46 and the coarse control switch 50 constitute a rotation control switch for coarse adjustment, and the fine adjustment knob 47 and the fine control switch 51 constitute a rotating position control switch for fine adjustment.

The fine adjustment knob 47 is designed in disk-like shape, and the coarse adjustment knob 46 is designed in cylindrical shape and is arranged around the fine adjustment knob 47. The coarse adjustment knob 46 can be turned by a predetermined angle in both normal and reverse directions from a predetermined position, and the fine adjustment knob 47 is freely rotatable in normal and reverse directions. The coarse control switch 50 and the fine control switch 51 issue electric signals, which is proportional to rotating status of the coarse adjustment knob 46 and the fine adjustment knob 47. The coarse adjustment knob 46, the fine adjustment knob 47, the coarse control switch 50 and the fine control switch 51 are arranged concentrically.

Figure 2:
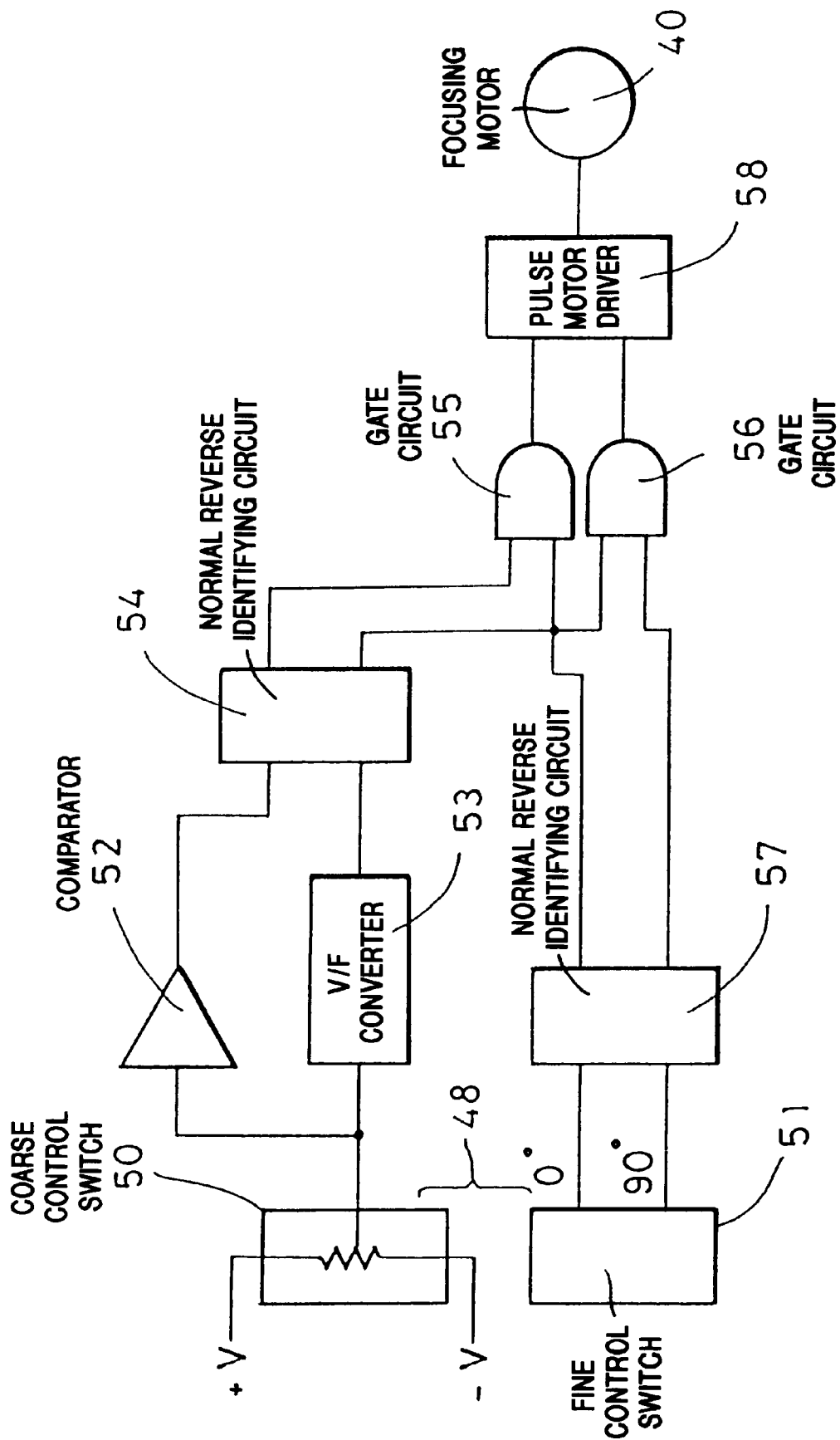
FIG. 2 is a block diagram showing focusing control in the above embodiment.
Figure 3:
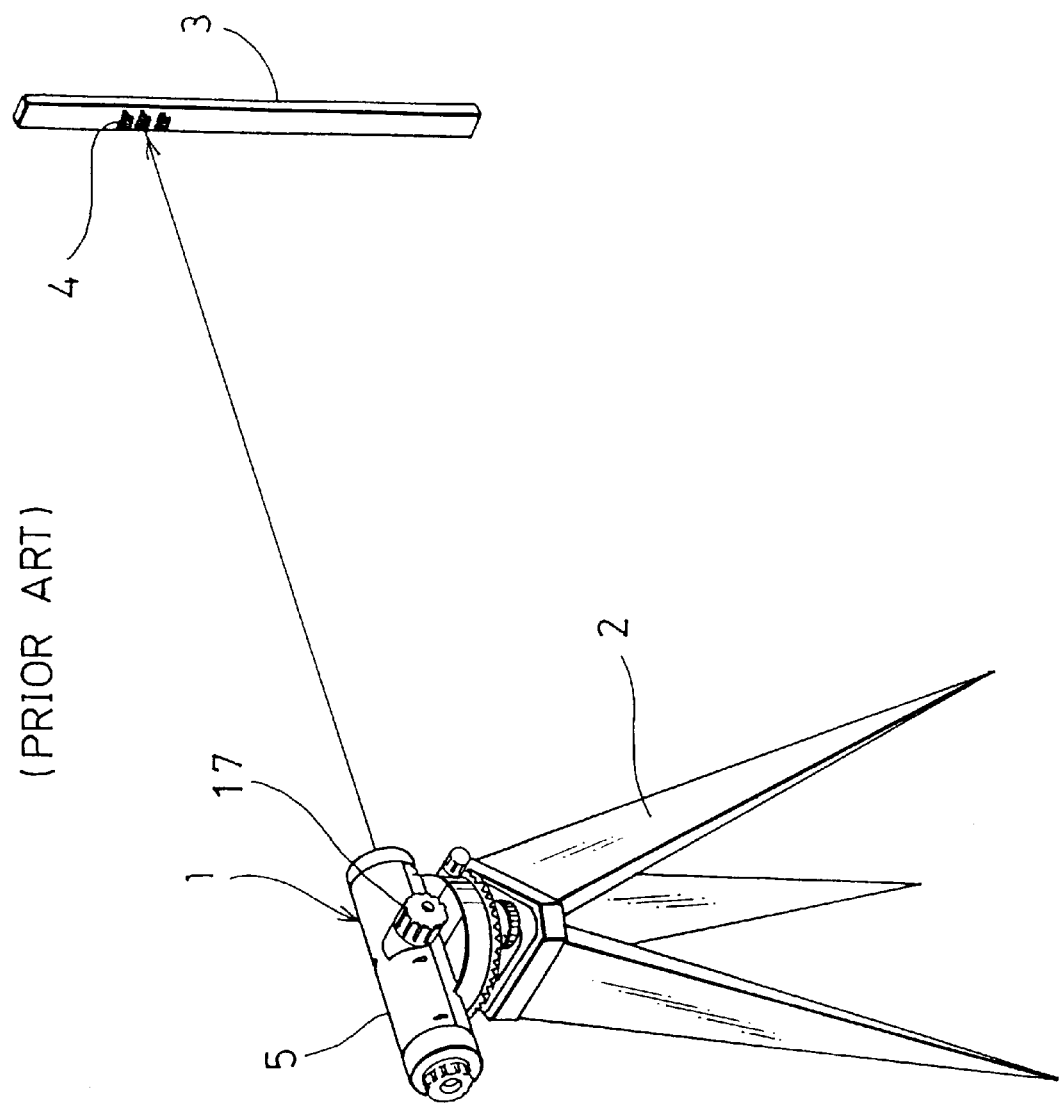
FIG. 3 is a perspective view showing relationship between a leveling instrument and a staff.
Figure 4:
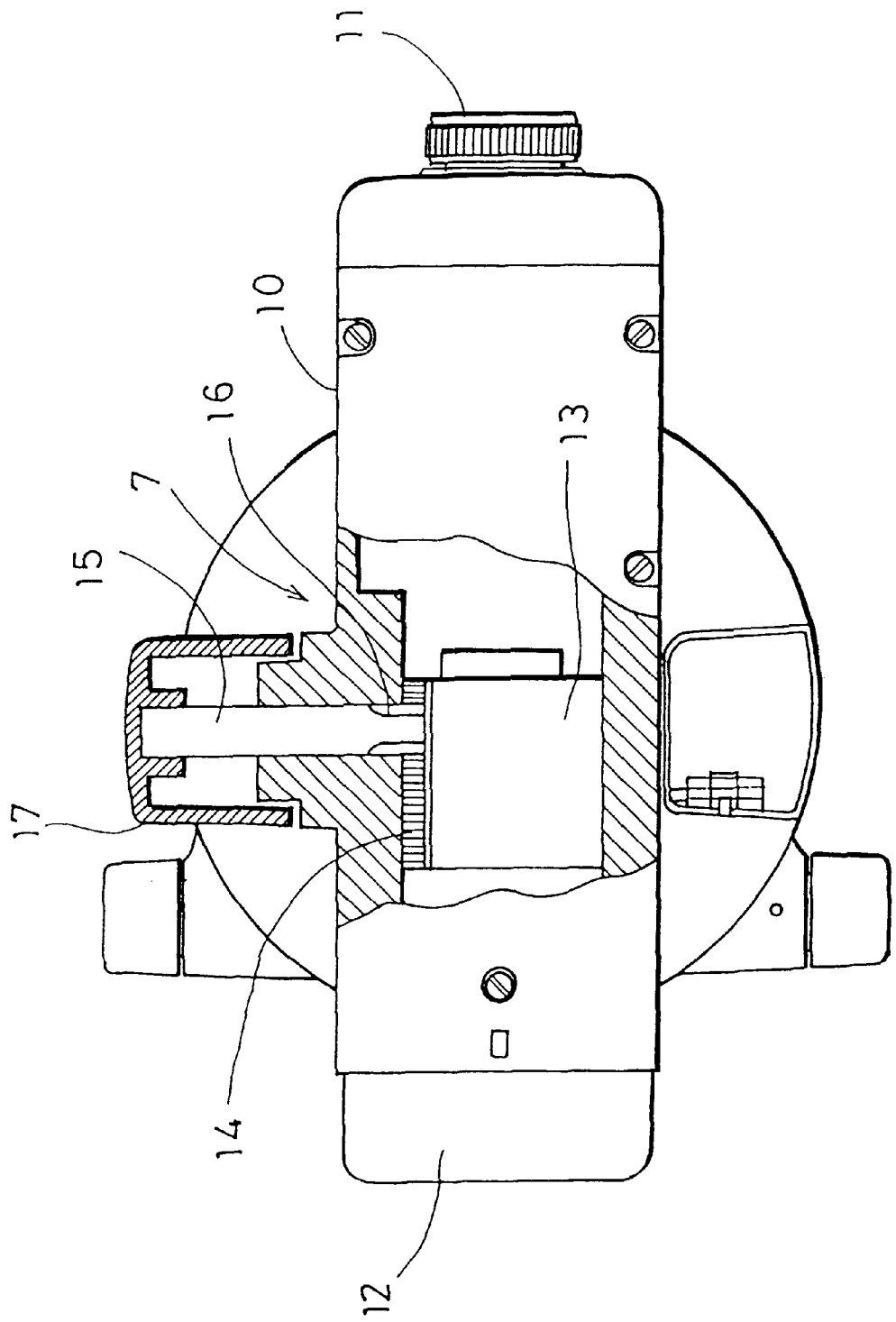
FIG. 4 is a schematical drawing of a leveling instrument provided with a conventional type focusing controller.

FIG. 2 is a control block diagram of the motor driving control circuit 42. The control switch 48 comprises the coarse control switch 50, which is a potentiometer, and the fine control switch 51, which is a rotary encoder. The coarse control switch 50 is connected to power sources of +V and −V, and the coarse control switch 50 is connected to a normal-reverse identifying circuit 54 via a comparator 52 and a V/F converter 53. The normal-reverse identifying circuit 54 is connected to a pulse motor driver 58 via gate circuits 55 and 56. The pulse motor driver 58 drives the focusing motor 40.

The V/F converter 53 issues a pulse with frequency proportional to absolute value of the inputted voltage. The comparator 52 determines whether the input voltage is positive or negative and issues a designation signal to the normal-reverse identifying circuit 54 to designate whether the output of the V/F converter 53 should be normal pulse or reverse pulse.

The fine control switch 51 is a rotary encoder to output two phases with phase angles varied by 90° from each other. The fine control switch 51 is connected to the normal-reverse identifying circuit 57, which issues normal rotation pulse and reverse rotation pulse. The normal-reverse identifying circuit 57 is connected to the pulse motor driver 58 via the gate circuits 56 and 55, and the pulse motor driver 58 drives the focusing motor 40.

In the following, description will be given on the operation.

The surveyor turns the coarse adjustment knob 46 among the focusing knobs 45 and performs coarse adjustment by turning the coarse adjustment knob 46 at any angles. With the rotation of the coarse adjustment knob 46, the coarse control switch 50 is rotated by the angle corresponding to the rotation angle of the coarse adjusting knob 46. When the coarse control switch 50 is turned at said angle, voltage proportional to the rotation angle is outputted, and the output voltage is outputted to the V/F converter 53 and the comparator 52. The V/F converter 53 converts the output voltage to a pulse with frequency corresponding to the absolute value, and the comparator 52 inputs positive or negative value of the output voltage to the normal-reverse identifying circuit 54. In response to the input from the comparator 52 and the V/F converter 53, the normal-reverse identifying circuit 54 inputs the normal rotation pulse or the reverse rotation pulse to the pulse motor driver 58 via the gate circuits 55 and 56. Thus, the focusing motor 40 is rotated in normal or reverse direction as desired and at a speed as desired. The normal rotation pulse or the reverse rotation pulse is sent to the focusing motor 40, and the focusing motor 40 is continuously rotated at a speed proportional to the rotating angle of the coarse control switch 50. At a position approximately focused, the coarse adjustment knob 46 is released, and coarse adjustment operation is now completed.

Next, fine adjustment is performed by turning the fine adjustment knob 47.

With the rotation of the fine adjustment knob 47, the fine control switch 51 is rotated. When the fine control switch 51 is rotated at any angles, the number of pulse signals corresponding to the amount of rotation is outputted. The normal-reverse identifying circuit 57 determines whether the outputted pulse signal is positive or negative, and a pulse signal is outputted to the pulse motor driver 58 via the gate circuits 55 and 56, and the focusing motor 40 is rotated at an angle corresponding to the inputted number of pulses. The amount of rotation of the focusing motor 40 is detected by the rotary encoder (not shown), and positioning of the sliding tube 26 is performed. In this way, the surveyor can easily carry out delicate positioning by turning the fine adjustment knob 47.

When the sliding tube 26 is moved in the direction toward the objective lens 22 with the rotation of the focusing motor 40, the sliding tube 26 pushes the limit switch 43, and the rotation of the focusing motor 40 is stopped. When the sliding tube 26 is moved in the direction toward the compensation optical system 25 with the rotation of the focusing motor 40, the sliding tube 26 pushes the limit switch 44, and the rotation of the focusing motor 40 is stopped.

As described above, by turning the coarse control switch 50, the focusing lens 27 can be moved at a speed proportional to the rotation angle. Specifically, by turning the coarse control switch 50, focusing of the telescope can be coarsely adjusted relatively quickly.

By turning the fine control switch 51, the focusing lens 27 can be moved to an angular position corresponding to the rotation angle. Specifically, by turning the fine control switch 51, focusing of the telescope can be finely adjusted.

In the above embodiment, a potentiometer is used as the coarse control switch 50, and a rotary encoder is used as the fine control switch 51, while a rotary encoder may be used as the coarse control switch 50, and a potentiometer may be used as the fine control switch 51. Also, a servomotor and a servomotor driver may be used instead of the pulse motor.

By combining the focusing controller of the present invention with an auto-focusing mechanism for automatically focusing a target object, even a beginner can perform surveying operation with high accuracy.

As described above, it is possible according to the present invention to perform focusing of a telescope near the measuring point within relatively short time by rotating the rotating speed control switch and also to perform fine adjustment of focusing of the telescope by turning the rotating position control switch. Therefore, this makes it possible to carry out focusing on the measurement by survey instrument quickly and at high accuracy, and superb effect can be attained to perform focusing even by an operator without skill and experience.

What I claim are:

1. A focusing controller for a survey instrument, comprising a sliding tube retaining a focusing lens and movable in the direction of an optical axis, a motor for moving the sliding tube in the direction of the optical axis, a motor driving control circuit for driving the motor, a rotating speed control switch which serves as a means for inputting coarse adjustment control to the motor driving circuit, and a rotating position control switch which serves as a means for inputting fine adjustment control to the motor driving circuit.

2. A focusing controller for a survey instrument according to claim 1, wherein said rotating speed control switch and said rotating position control switch are designed in circular shape and are arranged concentrically.

3. A focusing controller for a survey instrument according to claim 1, wherein said rotating speed control switch is a potentiometer.

4. A focusing controller for a survey instrument according to claim 1, wherein said rotating speed control switch is a rotary encoder.

5. A focusing controller for a survey instrument according to claim 1, wherein said rotating position control switch is a potentiometer.

6. A focusing controller for a survey instrument according to claim 1, wherein said rotating position control switch is a rotary encoder.

7. A focusing controller for a survey instrument according to claim 3 or 5, wherein said potentiometer outputs (+) voltage and (−) voltage in response to a first or second rotation, said second rotation being in a direction opposite said first rotation, and said motor driving circuit rotates the motor in said first or second direction depending upon whether the voltage is positive or negative to perform speed control for the motor to correspond to absolute voltage value.

8. A focusing controller for a survey instrument according to claim 4 or 6, wherein said rotary encoder outputs two different phases with phase angles varied by 90° from each other and outputs a number of pulses corresponding to the amount of rotation, and said motor driving circuit rotates the motor in a first or second direction in response to the phase, said first direction being opposite said second direction, and controls the motor in such manner that the amount of rotation corresponds to the number of pulses.

* * * * *